United States Patent Office 3,042,635
Patented July 3, 1962

3,042,635
COMPOSITION COMPRISING ASPHALT AND MIXTURE OF RESINS AND METHOD OF PREPARING SAME
Paul R. Wood, Naugatuck, Conn., assignor to United States Rubber Company, New York, N.Y., a corporation of New Jersey
No Drawing. Filed Oct. 9, 1959, Ser. No. 845,316
10 Claims. (Cl. 260—5)

This invention relates to asphalt compositions containing rubber.

Polymers such as natural rubber, butadiene polymer synthetic rubbers, polyisobutylene, and isobutylene-diolefine copolymer synthetic rubbers have been incorporated in the asphalt which is used in road surfacing, e.g. as the binder for the aggregate in paving constructions, and for roofing and other uses, generally in amount from 1 to 20 parts per 100 parts of the asphalt. In some cases the polymer is blended with the hot asphalt and used immediately as by mixing with the aggregate in a pug mill, but in other cases, the asphalt-polymer blend is kept in hot storage for considerable periods of time. I have found that whereas incorporating in the asphalt polyisobutylene or isobutylene-diolefine copolymer synthetic rubber having a Staudinger molecular weight of at least 40,000 advantageously increases the viscosity of the asphalt, it markedly impairs physical properties, such as impact strength, at ambient and low temperatures. I have further found that whereas incorporating in the asphalt natural rubber or butadiene polymer synthetic rubbers initially increases the viscosity of the asphalt, these improvements gradually disappear on hot storage due to depolymerization, of the rubber in the hot asphalt. However, I have found that the physical properties, such as impact strength, at ambient and low temperatures are markedly improved by the incorporation of the natural rubber or butadiene polymer synthetic rubbers, and such improvements are retained and even may be increased on hot storage.

According to the present invention, the asphalt is blended with polyisobutylene and/or isobutylene-diolefine copolymer synthetic rubber and also natural rubber and/or butadiene polymer synthetic rubber. The Staudinger molecular weight of the polyisobutylene or isobutylene-diolefine copolymer should be at least 40,000 and may be as high as 1,500,000. Commercial isobutylene-diolefine copolymer synthetic rubbers are known as Butyl rubbers and have Staudinger molecular weights of 40,000 and above. Commercial polyisobutylenes are known as Vistanex and are available in Staudinger molecular weights of 40,000 and above. Low molecular weight polyisobutylenes having Staudinger molecular weights up to 15,000 are also known but these have a high degree of cold flow and do not appreciably increase the viscosity of the asphalt as shown in Example 2 below and are of no value in the present invention. Any natural rubber or butadiene polymer synthetic rubber may be used. Where the asphalt blend is to be used without hot storage, depolymerized natural rubber or low molecular weight butadiene polymer synthetic rubbers are preferred, e.g. having a viscosity average molecular weight from 10,000 to 100,000, but higher molecular weight rubbers may also be used. Such low molecular weight butadiene polymer synthetic rubbers may be liquid, and may be prepared directly or be depolymerizing the higher molecular weight rubbers. Where hot storage is to take place, higher molecular weight natural rubber or butadiene polymer synthetic rubbers having a viscosity average molecular weight of over 100,000 to 1,000,000 or more, e.g. up to 3,000,000 will generally be used. The present invention gives increased viscosity to the asphalt as prepared and on hot storage, and improved physical properties, such as impact strength, at ambient and low temperatures, as prepared and on hot storage.

In carrying out the present invention, the polymers that are blended with the asphalt are virgin polymers, since reclaimed polymers do not give the improved properties to the asphalt that are imparted by the virgin polymers. The amount of total polymers added is in the range from 1 to 20 parts per 100 parts of the asphalt. The weight ratio of polyisobutylene and isobutylene-diolefine copolymer synthetic rubber to natural rubber and butadiene polymer synthetic rubber is in the range from 3:1 to 1:3.

The isoprene-diolefine copolymer rubbers are copolymers prepared at low temperatures, e.g. below $-50°$ C., of 70 to 99.5 parts of isobutylene and correspondingly 30 to 0.5 parts of a conjugated diolefine, e.g. butadiene-1,3, isoprene, 2,3 - dimethyl butadiene-1,3, piperylene. The commercial Butyl rubber is a copolymer of 96 to 99.5 parts of isobutylene and correspondingly 4 to 0.5 part of isoprene. The butadiene polymer synthetic rubbers are polymers prepared by aqueous emulsion polymerization of one or more butadienes-1,3, e.g. butadiene-1,3, isoprene, 2,3-dimethyl butadiene-1,3, piperylene, or a mixture of one or more such butadienes-1,3 with one or more other polymerizable compounds which are capable of forming rubbery copolymers with butadienes-1,3, for example, up to 60% by weight of such mixture of one or more compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene; chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines; alkyl vinyl pyridines. Commercial copolymers of butadiene and styrene have been called GR–S, and more recently SBR. Commercial copolymers of butadiene and acrylonitrile have been known as Buna N, and more recently called NBR.

In the examples below, changes in viscosity of the asphalt may be followed by the penetration value, a decrease in penetration value indicating increased viscosity and an increase in penetration value indicating decreased viscosity. Asphalt binders are conventionally graded according to penetration values at 77° F. as measured by the Standard Method of Test for Penetration of Bituminous Materials (A.S.T.M. D5–52), the penetration values being measured as the tenths of a millimeter that a tapered standard needle (0.14 to 0.16 mm. tip diameter)

will penetrate the asphalt at 77° F. in five seconds with a 100 gram load. Penetration values for asphalt binders range from 40 to 300, the lower penetration grades being used for hot climates and the higher penetration grades being used for cold climates. Any asphalt in this penetration range of 40 to 300 may be used in the present invention. A 112 penetration asphalt was used in all the examples and is a type that may be used in temperature climates. In the examples, impact strengths were measured at 0° C., 10° C., and 15° C. Impact strengths were measured by dropping steel balls of varying weights from 2 grams to 225 grams (23 different weight balls) from a height of 20 inches onto a 3 inch diameter disk one-eighth inch thick of the asphalt or asphalt-polymer blend with its circumference resting on the rim of a three-fourths inch high steel ring. The largest ball the sample under test could withstand without impact failure was recorded as the impact strength. An impact strength figure of "225" means that the sample did not fracture when tested with the largest 225 gram test ball, and it was not determined how heavy a test ball the sample could withstand. The weight of the largest ball before failure of the sample is the figure used in the tables below under the heading "Impact Strength." In the examples, all polymers were virgin polymers. The blends of asphalt and polymers were prepared by adding molten asphalt at a temperature of 250° F. to 300° F. to the polymers in an internal mixer of the Werner and Pfleiderer type without application of external heat. The hot storage ageings were carried out in closed containers at 325° F. with agitation. All parts and percentages referred to herein are by weight.

*Example 1*

This example shows the increase in viscosity of asphalt (decrease in penetration value) with the incorporation of Butyl rubber and the retention of this decreased viscosity on hot storage at 325° F. As contrasted to the Butyl rubber, the incorporation of GR–S and natural rubber similarly shown an increase in viscosity of the asphalt when initially mixed, but on hot storage at 325° F. the viscosity is markedly decreased to almost the viscosity of the asphalt itself after one week storage. The GR–S rubber in the various examples was a copolymer of about 76 parts of butadiene and about 24 parts of styrene. The following table shows the penetration values of asphalt blended with 5% of its weight of Butyl rubber, GR–S and natural rubber initially (i.e. as mixed), and under hot storage at 325° F. for 24 hours and 1 week.

| Polymer Added | Penetration Value | | |
|---|---|---|---|
| | Initial | 24 Hours | 1 Week |
| None (Plain Asphalt) | 112 | 112 | 110 |
| Butyl rubber, Staudinger mol. wt. 40,000 | 70 | 68 | 68 |
| GR–S, Viscosity average mol. wt. 300,000 | 88 | 85 | 98 |
| Natural Rubber, Viscosity average mol. wt. above 1,000,000 | 65 | 89 | 102 |

The increase in the penetration value on hot storage in the case of the GR–S and natural rubber was the result of depolymerization, which does not take place in hot storage of asphalt blended with Vistanex or Butyl rubber. One method of more directly showing such depolymerization is by determining the molecular weight of the rubber in an asphalt-rubber blend after varying periods of hot storage. This was done with a blend of asphalt and 3% of its weight of a GR–S. Molecular weights of the GR–S were measured on the plain GR–S, after initial blending with the asphalt, and after varying periods of hot storage at 325° F. The GR–S was separated from a benzene solution of the asphalt blends by precipitation with methanol and the average molecular weight was determined by the intrinsic viscosity. Results are shown in the following table:

| | Intrinsic Viscosity | Viscosity Average Molecular Weight |
|---|---|---|
| Plain GR–S | 3.90 | 603,000 |
| After initial blending | 2.62 | 332,000 |
| 2 Hours heating | 1.56 | 159,000 |
| 1 Day heating | 1.23 | 107,000 |
| 5 Days heating | 0.95 | 74,000 |
| 12 Days heating | 0.71 | 48,000 |
| 20 Days heating | 0.47 | 25,000 |

*Example 2*

This example shows the great increase in viscosity of asphalt with the incorporation of polyisobutylenes having a Staudinger molecular weight of 40,000 and over as compared with only a very minor and relatively insignificant increase in viscosity of asphalt with the incorporation of the low molecular weight polyisobutylenes which are outside the scope of the present invention. The initial penetration value of plain asphalt and the asphalt to which 5% of various polyisobutylenes of high and low molecular weights had been added to the molten asphalt is shown in the following table:

Polyisobutylene added: Penetration value
    None (plain asphalt) _____ 112
    Vistanex LM–MS (mol. wt. 10,000–11,500) __ 98
    Vistanex LM–MH (mol. wt. 11,500–13,000) __ 95
    Vistanex L 60 (mol. wt. 46,000–64,000) _____ 74
    Vistanex L 300 (mol. wt. 1,500,000) _____ 67

Interpreting the above penetration values, a drop from 112 for the straight asphalt to 95–98 for the low molecular weight Vistanex represents only a very minor increase in viscosity, whereas a drop from 112 to 67–74 for the higher molecular weight Vistanex represents a great increase in viscosity. Only higher molecular weight polyisobutylenes, e.g. those having a molecular weight of at least 40,000 appreciably increase the viscosity and elasticity of the asphalt and are of value in the present invention.

*Example 3*

This example shows the reduction in impact strength of the asphalt on blending with Butyl rubber and Vistanex having Staudinger molecular weights of 40,000 and above, and the increase in impact strength of the asphalt on blending with GR–S, polybutadiene and natural rubber. The temperature for the hot storage tests was 325° F. The plain asphalt and the blends for the initial tests were heated for a minimum length of time to raise the temperature to 325° F. so that the material could be poured into the molds for the impact test discs. Results are shown in the following table:

| Polymer Added | Impact Strength | | |
|---|---|---|---|
| | 0° C. | 10° C. | 15° C. |
| None (Plain Asphalt) | 12 | 40 | 49 |
| Butyl rubber, Staudinger mol. wt. 40,000: | | | |
|   Initial | 8 | 28 | 36 |
|   Hot storage 24 hours | 8 | 28 | 36 |
| Vistanex, Staudinger mol. wt. 90,000; Initial | 8 | 12 | 19 |
| GR–S, Viscosity average mol. wt. 300,000: | | | |
|   Initial | 16 | 55 | 225 |
|   Hot storage 24 hours | 19 | 95 | 225 |
| Polybutadiene, Viscosity average mol. wt. 500,000: | | | |
|   Initial | 8 | 40 | 95 |
|   Hot storage 24 hours | 16 | 55 | 225 |
| Natural rubber, Viscosity average mol. wt. above 1,000,000: | | | |
|   Initial | 12 | 19 | 95 |
|   Hot storage 24 hours | 16 | 36 | 225 |

*Example 4*

This example shows the increase in viscosity and increase in impact strength of the asphalt, as mixed and on hot storage at 325° F., when blended with the two kinds of polymers according to the present invention.

| Polymer Added | Penetration Value | Impact Strength | | |
|---|---|---|---|---|
| | | 0° C. | 10° C. | 15° C. |
| None (Plain Asphalt) | 112 | 12 | 40 | 49 |
| 2.5% Butyl Rubber, Staudinger mol. wt. 40,000; 2.5% GR-S Viscosity average mol. wt. 70,000, Initial | 82 | 25 | 55 | 225 |
| 2.5% Butyl Rubber, Staudinger mol. wt. 40,000; 2.5% Polybutadiene, Viscosity average mol. wt. 20,000, Initial | 85 | 19 | 45 | 130 |
| 2.5% Butyl Rubber, Staudinger mol. wt. 40,000; 2.5% GR-S Viscosity average mol. wt. 300,000, Hot storage 1 week | 79 | 19 | 55 | 130 |
| 2.5% Butyl Rubber, Staudinger mol. wt. 40,000; 2.5% Polybutadiene Viscosity average mol. wt. 300,000, Hot storage 1 week | 81 | 19 | 55 | 130 |
| 2.5% Butyl Rubber, Staudinger mol. wt. 40,000; 2.5% Natural Rubber which is depolymerized ("DPR"), Viscosity average mol. wt. 15,000, Initial | 87 | 25 | 55 | 225 |
| 2.5% Butyl Rubber, Staudinger mol. wt. 40,000; 2.5% Natural Rubber, Viscosity average mol. wt. above 1,000,000, Hot storage 1 week | 86 | 25 | 95 | 225 |
| 2.5% Vistanex, Staudinger mol. wt. 40,000; 2.5% GR-S, Viscosity average mol. wt. 70,000, Initial | 81 | 25 | 55 | 225 |
| 2.5% Vistanex, Staudinger mol. wt. 40,000; 2.5% GR-S, Viscosity average mol. wt. 300,000, Hot storage 1 week | 80 | 19 | 55 | 130 |

*Example 5*

This example shows that low molecular weight polyisobutylene when added to asphalt with natural rubber or butadiene polymer synthetic rubber will not give the improved impact strength of the present invention as shown in the following table:

| Polymer Added | Penetration Value | Impact Strength | | |
|---|---|---|---|---|
| | | 0° C. | 10° C. | 15° C. |
| None (Plain Asphalt) | 112 | 12 | 40 | 49 |
| 2.5% Vistanex LM-MS, Staudinger mol. wt. 10,000–11,500; 2.5% GR-S Viscosity average mol. wt. 300,000, Initial | 85 | 4 | 8 | 28 |
| 2.5% Vistanex LM-MS, Staudinger mol. wt. 10,000–11,500; 2.5% Natural Rubber Viscosity average mol. wt. above 1,000,000, Initial | 80 | 8 | 22 | 49 |

This is a continuation-in-part of application Serial No. 680,925, filed August 29, 1957, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition comprising 100 parts by weight of asphalt and 1 to 20 parts by weight of a mixture of material selected from the group consisting of virgin polyisobutylene having a Staudinger molecular weight of 40,000 to 1,500,000 and virgin synthetic rubber copolymers of 70 to 99.5 parts of isobutylene and correspondingly 30 to 0.5 parts of a conjugated diolefine selected from the group consisting of butadiene-1,3, isoprene, 2-3-dimethyl butadiene-1,3 and piperylene, said copolymer having a Staudinger molecular weight of 40,000 to 1,500,000 and material selected from the group consisting of natural rubber and synthetic rubber polymers of materials selected from the group consisting of butadienes-1,3 selected from the class consisting of butadiene-1,3, isoprene, 2,3-dimethyl butadiene and piperylene and mixtures of said butadienes-1,3 with up to 60% by weight of such mixtures of compounds which contain a $CH_2=C<$ group and are copolymerizable with butadienes-1,3, the weight ratio of the former material to the latter material being in the range from 3:1 to 1:3.

2. A composition comprising 100 parts by weight of asphalt and 1 to 20 parts by weight of a mixture of material selected from the group consisting of virgin polyisobutylene having a Staudinger molecular weight of 40,000 to 1,500,000 and virgin synthetic rubber copolymers of 96 to 99.5 parts of isobutylene and correspondingly 4 to 0.5 parts of isoprene having a Staudinger molecular weight of 40,000 to 1,500,000 and material selected from the group consisting of natural rubber and synthetic rubber polymers of materials selected from the group consisting of butadienes-1,3 selected from the class consisting of butadiene-1,3, isoprene, 2,3-dimethyl butadiene and piperylene and mixtures of said butadienes-1,3 with up to 60% by weight of such mixtures of compounds which contain a $CH_2=C<$ group and are copolymerizable with butadienes-1,3, the weight ratio of the former material to the latter material being in the range from 3:1 to 1:3.

3. A composition comprising 100 parts by weight of asphalt and 1 to 20 parts by weight of a mixture of virgin synthetic rubber copolymer of 96 to 99.5 parts of isobutylene and correspondingly 4 to 0.5 part of isoprene having a Staudinger molecular weight of 40,000 to 1,500,000 and virgin synthetic rubber copolymer of a mixture of butadiene-1,3 with up to 60% of said mixture of styrene, the weight ratio of the isobutylene-isoprene copolymer synthetic rubber to the butadiene-styrene copolymer synthetic rubber being in the range from 3:1 to 1:3.

4. A composition comprising 100 parts by weight of asphalt and 1 to 20 parts by weight of a mixture of virgin synthetic rubber copolymer of 96 to 99.5 parts of isobutylene and correspondingly 4 to 0.5 parts of isoprene having a Staudinger molecular weight of 40,000 to 1,500,000 and virgin natural rubber, the weight ratio of the isobutylene-isoprene copolymer synthetic rubber to the natural rubber being in the range from 3:1 to 1:3.

5. A composition comprising 100 parts by weight of asphalt and 1 to 20 parts by weight of a mixture of virgin polyisobutylene having a Staudinger molecular weight of 40,000 to 1,500,000 and virgin synthetic rubber copolymer of a mixture of butadiene-1,3 with up to 60% of said mixture of styrene, the weight ratio of the polyisobutylene to the butadiene-styrene copolymer synthetic rubber being in the range from 3:1 to 1:3.

6. The method of preparing an asphalt composition which comprises blending molten asphalt with two types of virgin polymers, one type of virgin polymer being selected from the group consisting of polyisobutylene having a Staudinger molecular weight of 40,000 to 1,500,000 and synthetic rubber copolymers of 70 to 99.5 parts by weight of isobutylene and correspondingly 30 to 0.5 parts by weight of a conjugated diolefine selected from the group consisting of butadiene-1,3, isoprene, 2,3-dimethyl butadiene-1,3 and piperylene, said copolymer having a Staudinger molecular weight of 40,000 to 1,500,000, and the other type of virgin polymer being selected from the group consisting of natural rubber and synthetic rubber polymers of materials selected from the group consisting of butadienes-1,3 selected from the class consisting of butadiene-1,3, isoprene, 2,3-dimethyl butadiene and piperylene and mixtures of said butadienes-1,3 with up to 60% by weight of such mixtures of compounds which contain a $CH_2=C<$ group and are copolymerizable with butadienes-1,3, the weight ratio of the former type of virgin polymer to the later type of virgin polymer being in the range from 3:1 to 1:3, and the amount of the two types of virgin polymer together being from 1 to 20 parts by weight per 100 parts by weight of the asphalt.

7. The method of preparing an asphalt composition which comprises blending molten asphalt with two types of virgin polymers, one type of virgin polymer being selected from the group consisting of polyisobutylene having a Staudinger molecular weight of 40,000 to 1,500,000 and synthetic rubber copolymers of 96 to 99.5 parts by weight of isobutylene and correspondingly 4 to 0.5 parts by weight of isoprene having a Staudinger molecular weight of 40,000 to 1,500,000, and the other type of virgin polymer being selected from the group consisting of natural rubber and synthetic rubber polymers of materials selected from the group consisting of butadienes-1,3 selected from the class consisting of butadiene-1,3, isoprene, 2,3-dimethyl butadiene and piperylene and mixtures of said butadienes-1,3 with up to 60% by weight of such mixtures of compounds which contain a $$CH_2=C<$$

group and are copolymerizable with butadienes-1,3, the weight ratio of the former type of virgin polymer to the later type of virgin polymer being in the range from 3:1 to 1:3, and the amount of the two types of virgin polymer together being from 1 to 20 parts by weight per 100 parts by weight of the asphalt.

8. The method of preparing an asphalt composition which comprises blending molten asphalt with a virgin synthetic rubber copolymer of 96 to 99.5 parts by weight of isobutylene and correspondingly 4 to 0.5 parts by weight of isoprene having a Staudinger molecular weight of 40,000 to 1,500,000 and a virgin synthetic rubber copolymer of a mixture of butadiene-1,3 with up to 60% of said mixture of styrene, the weight ratio of the isobutylene-isoprene copolymer to the butadiene-styrene copolymer being in the range from 3:1 to 1:3, and the amount of the two copolymers together being from 1 to 20 parts by weight per 100 parts by weight of the asphalt.

9. The method of preparing an asphalt composition which comprises blending molten asphalt with a virgin synthetic rubber copolymer of 96 to 99.5 parts by weight of isobutylene and correspondingly 4 to 0.5 parts by weight of isoprene having a Staudinger molecular weight of 40,000 to 1,500,000 and virgin natural rubber, the weight ratio of the isobutylene-isoprene copolymer to the natural rubber being in the range from 3:1 to 1:3, and the amount of the isobutylene-isoprene copolymer and the natural rubber together being from 1 to 20 parts by weight per 100 parts by weight of the asphalt.

10. The method of preparing an asphalt composition which comprises blending molten asphalt with a virgin polyisobutylene having a Staudinger molecular weight of 40,000 to 1,500,000 and virgin natural rubber, the weight ratio of the polyisobutylene to the natural rubber being in the range from 3:1 to 1:3, and the amount of the polyisobutylene and the natural rubber together being from 1 to 20 parts by weight per 100 parts by weight of the asphalt.

References Cited in the file of this patent

UNITED STATES PATENTS

| | | |
|---|---|---|
| 2,485,625 | Merley | Oct. 25, 1949 |
| 2,772,903 | Sussenbach | Dec. 4, 1956 |